United States Patent [19]

Sugiuchi et al.

[11] Patent Number: 4,598,979
[45] Date of Patent: Jul. 8, 1986

[54] ELECTROCHROMIC DISPLAY DEVICE

[75] Inventors: Masami Sugiuchi, Yokohama; Masataka Miyamura, Kamakura; Atsuo Imai; Shigeru Matake, both of Yokohama, all of Japan

[73] Assignee: Tokyo Shibaura Denki Kabushiki Kaisha, Kawasaki, Japan

[21] Appl. No.: 556,596

[22] Filed: Nov. 30, 1983

[30] Foreign Application Priority Data

Nov. 30, 1982 [JP] Japan .................................. 57-208478

[51] Int. Cl.$^4$ ...................... G02F 1/01; G01N 33/00; G03G 5/026
[52] U.S. Cl. ................................ 350/357; 252/408.1; 252/600
[58] Field of Search ........................... 252/600, 408.1; 350/357

[56] References Cited

U.S. PATENT DOCUMENTS

| | | | |
|---|---|---|---|
| 3,995,943 | 12/1976 | Jasinski ........................ | 252/408.1 X |
| 4,013,343 | 3/1977 | Jaccard et al. ............... | 252/408.1 X |
| 4,028,204 | 6/1977 | Rosen et al. .................. | 252/600 X |
| 4,036,648 | 7/1977 | Engler et al. ................. | 252/408.1 X |
| 4,046,950 | 9/1977 | Isett .............................. | 428/411 |
| 4,082,552 | 4/1978 | Engler et al. ................. | 252/408.1 X |
| 4,093,358 | 6/1978 | Shattuck et al. ............. | 350/357 |
| 4,110,015 | 8/1978 | Reddy ........................... | 252/600 X |
| 4,142,783 | 3/1979 | Engler et al. ................. | 252/600 X |
| 4,174,152 | 11/1979 | Giglia et al. .................. | 252/600 X |
| 4,211,475 | 7/1980 | Malugani et al. ............. | 252/600 X |
| 4,249,013 | 2/1981 | Haddon et al. ............... | 252/600 X |
| 4,297,005 | 10/1981 | Johnson, Jr. et al. ......... | 350/357 |
| 4,306,774 | 12/1981 | Nicholson ..................... | 350/357 |
| 4,312,991 | 1/1982 | Engler et al. ................. | 549/39 |
| 4,312,992 | 1/1982 | Green ........................... | 549/59 |
| 4,325,611 | 4/1982 | Huggins et al. .............. | 252/600 X |
| 4,340,278 | 7/1982 | Beni et al. .................... | 252/408.1 X |
| 4,343,537 | 8/1982 | Guntherodt et al. ......... | 252/600 X |

FOREIGN PATENT DOCUMENTS 0032991 8/1981 European Pat. Off. ............ 350/357
2393388 12/1978 France ................................ 350/357

OTHER PUBLICATIONS

Pine et al., Organic Chemistry, 4th Ed., p. 391.
Chemical Abstracts Service: 9168(f), 1966, vol. 64, 13520(e), 1966, vol. 64, 18627(g), 1966, vol. 64, 12981(h), 1966, vol. 65, 47220, 1982, vol. 97, 166897, 1983, vol. 99.
Chemical Abstracts Service; Abstracts: 81697, 1984, vol. 101, 101326, 1984, vol. 101, 201630-2, 1984, vol. 101, 219902-3, 1984, vol. 101.
IBM Technical Disclosure Bulletin, vol. 18, No. 11, p. 3863, (Apr. 1976).
Appl. Phys. Lett. 36(6), Mar. 15, 1980, F. B. Kaufman et al, "Polymer-Modified Electrodes: A New Class of Electrochromic Materials", pp. 422-425.
Proceedings of the 43rd autumn meeting of the Japan Society of Applied Physics, Fukuoka 70(28a-K-3) (1982), S. Hirai et al.

*Primary Examiner*—Teddy S. Gron
*Assistant Examiner*—Catherine S. Kilby
*Attorney, Agent, or Firm*—Oblon, Fisher, Spivak, McClelland & Maier

[57] ABSTRACT

An electrochromic display device includes a transparent first electrode and a second electrode opposing said first electrode to be spaced apart therefrom. An electrochromic layer is formed in a space formed between the first and second electrodes so as to be in contact with the first electrode. The electrochromic layer is formed of certain naphthalene derivatives, certain tetracene derivatives or certain fulvalene derivatives. An ionic conductor layer is formed in the space so as to be in contact with the electrochromic layer.

21 Claims, 3 Drawing Figures

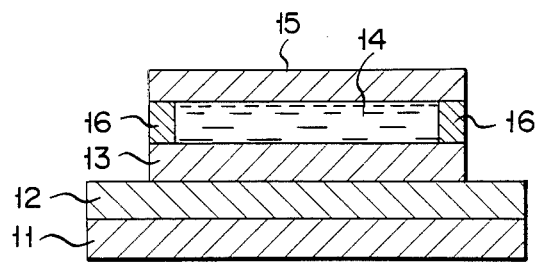
F I G. 1
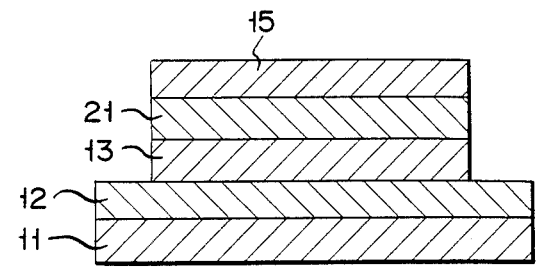
F I G. 2
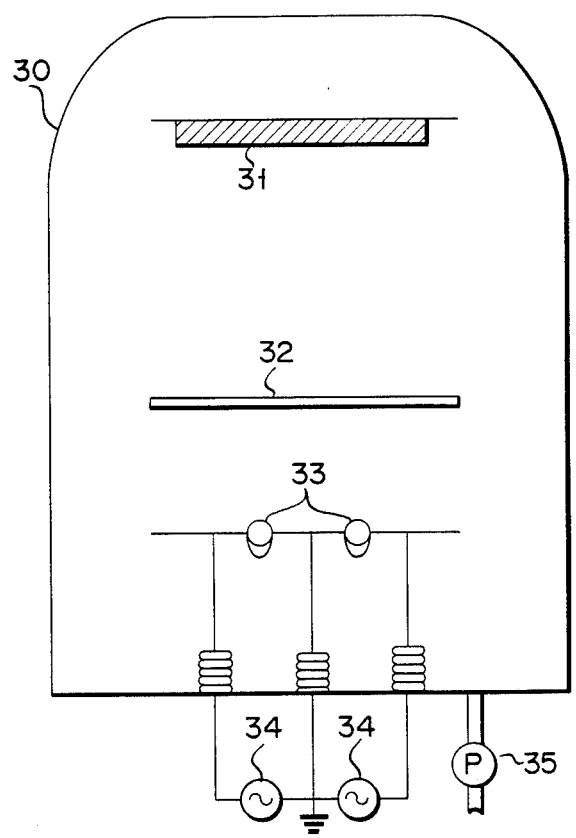
F I G. 3

4,598,979

ELECTROCHROMIC DISPLAY DEVICE

BACKGROUND OF THE INVENTION

I. Field of the Invention

The present invention relates to an electrochromic display device and, more particularly, to an electrochromic display device using an organic electrochromic material.

II. Description of the Prior Art

Conventionally, an electrochromic (EC) display device includes a display electrode comprising an EC layer on a transparent conductor film and an opposing electrode, and has a structure wherein a liquid- or solid-phase electrolyte layer is sandwiched between the two electrodes. Both inorganic and organic EC materials are used.

Transition metal oxides such as $WO_3$ and $MoO_3$ are known as inorganic EC materials. An inorganic EC material is deposited on a transparent conductor film. When a display electrode of the EC display device using $WO_3$ is negatively biased, electrons are injected into the $WO_3$, so that the display electrode becomes blue. In the device of this type, a material having stable reversible potential must be used as an electrode opposing the display electrode. In general, a symmetrical cell using reduced $WO_3$ is used. However, the reduced state changes during operation of the device, thus resulting in an unstable display state and low reliability.

A viologen compound, a pyridine compound and a rhodamine compound are known as organic EC materials. A typical example is a device wherein viologen is sandwiched between a pair of electrodes. When the display electrode is negatively biased, viologen is one-electron reduced and is precipitated on the display electrode, so that the display electrode is colored. However, in the device of this type, the anion radical changes over time after precipitation. As a result, the color will not disappear even when the reverse bias voltage is applied, resulting in inconvenience.

As described above, the reversibility of the conventional EC display device is not complete, and the display element has a short life and poor reliability.

SUMMARY OF THE INVENTION

It is, therefore, an object of the present invention to provide an electrochromic display device which has a long service life and high reliability.

The electrochromic display device of the present invention includes a transparent first electrode and a second electrode opposing the first electrode. An electrochromic layer and an adjoining ionic conductor layer are sandwiched between the first and second electrodes. The electrochromic layer is made of an electrochromic material selected from the group consisting of a naphthalene derivative given by formula (I) below:

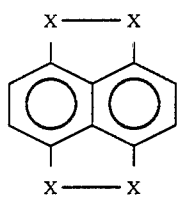
(I)

where X is sulfur (S), selenium (Se) or tellurium (Te), a tetracene derivative given by formula (II) below:

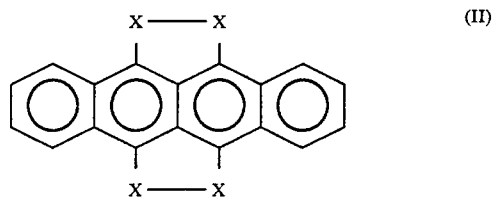
(II)

where X has the same meaning as given in formula (I), and a fulvalene derivative given by formula (III) below:

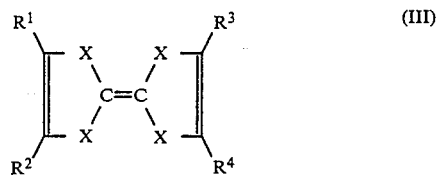
(III)

where X has the same meaning as given in formula (I); and each of $R^1$, $R^2$, $R^3$ and $R^4$ is hydrogen, an alkyl group or an aryl group.

The electrochromic material is preferably formed into a film by vapor deposition under reduced pressure.

BRIEF DESCRIPTION OF THE DRAWINGS

FIG. 1 is a sectional view of an electrochromic display device according to an embodiment of the present invention;

FIG. 2 is a sectional view of an electrochromic display device according to another embodiment of the present invention; and FIG. 3 is a schematic view of a deposition apparatus suitable for forming the electrochromic layer of the present invention.

DETAILED DESCRIPTION OF THE PREFERRED EMBODIMENTS

As previously described, the organic EC material used in the invention is a naphthalene derivative given by formula (I), a tetracene derivative given by formula (II), or a fulvalene derivative given by formula (III).

The electrochromic material of the present invention is one- or two-electron oxidized so as to produce a stable cation radical, thereby changing a visible light absorption characteristic, when a positive voltage is applied thereto. When a negative voltage is applied to the electrochromic material, the cation radical is reduced so that the absorption characteristic of the visible light can be restored. In this manner, the electrochromic display device of the present invention shows stable electrochromic characteristics upon application of forward and reverse bias voltages.

Typical examples of the naphthalene derivatives given by formula (I) are tetrathionaphthalene, tetraselenonaphthalene and tetratelluronaphthalene. The colors of these naphthalene derivatives are green, blue and yellow, respectively. The colors change to yellow, orange and red, respectively, when a voltage of 2 V or more is applied to these derivatives.

Typical examples of the tetracene derivatives given by formula (II) are tetrathiotetracene, tetraselenotetracene, and tetratellurotetracene. The colors of these derivatives are green, blue and yellow, respectively. The colors change to yellow, orange and red, respectively, when a voltage of 2 V or more is applied to the derivatives.

Each of symbols $R^1$, $R^2$, $R^3$ and $R^4$ in formula (III) representing the fulvalene derivative is hydrogen, an alkyl group, or an aryl group. The alkyl group generally has 1 to 5 carbon atoms. The aryl group includes phenyl group or a substituted phenyl group. The substituent on the phenyl group includes an alkyl group such as methyl group; hydroxyl group; an amino group; and an alkoxyl group (—OR) such as methoxy group. One typical example of the fulvalene derivatives is tetrathiofulvalene. The color of this derivative is yellow and changes to red when a voltage of 2 V or more is applied.

The EC display device of the present invention includes both one utilizing a liquid ionic conductor and one utilizing solid ionic conductors. As shown in FIG. 1, the EC display device using the liquid-phase ionic conductor has a transparent electrode 12 formed on a substrate 11. An EC layer 13 made of the above-mentioned EC material is formed on the transparent electrode 12. A spacer 16 is inserted between an opposing electrode 15 and the EC layer 13, and a sealed space defined by the EC layer 13, the opposing electrode 15 and the spacer 16 is filled with a liquid ionic conductor 14.

A solution of a inorganic electrolyte such as a halogenide (e.g., KCl), a perchlorate (e.g., $LiClO_4$) and a nitrate (e.g., $KNO_3$) may be used as the liquid ionic conductor. Water or an organic solvent such as acetonitrile, dimethylformamide, dimethylacetoamide, propylene carbonate, methanol, ethanol, methylene chloride, acetone, pyridine, and ethylenediamine is used as a solvent of the inorganic electrolyte. The concentration of the solution falls within the range between 0.01 mol % and 10 mol %.

In order to prepare the EC display device, the structure excluding the liquid ionic conductor 14 in FIG. 1 is first obtained. A through hole (not shown) is preformed in the spacer 16. Thereafter, the liquid ionic conductor 14 is injected into the space between the EC layer 13 and the opposing electrode 15 through the through hole. Finally, the through hole of the spacer is sealed.

An EC display element using a solid ionic conductor does not have the spacer 16, as shown in FIG. 2. The structure shown in FIG. 2 is substantially the same as that shown in FIG. 1 except that a solid ionic conductor layer 21 is sandwiched between an EC layer 13 and an opposing electrode 15. The same reference numerals as used in FIG. 1 denote the same parts in FIG. 2. The solid ionic conductor includes the following solid electrolyte.

1. Solid Electrolyte comprising Organic Polymeric Materials and Inorganic Ionic Conductors It is essential that polymers associated with this electrolyte are formed into transparent films. Examples are polystyrene, polyvinyl chloride, a vinyl chloride-vinyl acetate copolymer, polyvinyl acetate, polyvinyl acetal, phenolic resin, epoxy resin, alkyd resin, acrylic resin (including methacrylic resin), polyacrylonitrile, butadiene-based synthetic rubber, polyolefin, and a mixture thereof.

Examples of the inorganic ionic conductor include cation conductors such as lithium fluoride (LiF), lithium iodide (LiI), lithium hydroxide (LiOH), lithium perchlorate ($LiClO_4$), sodium fluoride (NaF), sodium iodide (NaI), sodium hydroxide (NaOH), sodium perchlorate ($NaClO_4$), and a mixture thereof. The content of the inorganic ionic conductor material preferably falls within the range of 0.01 to 1000% and more preferably the range of 20 to 100% of the weight of the polymeric material. When the content of the inorganic ionic conductor material is less than 0.01% by weight, the color contrast is degraded and the display function becomes defective. However, when the content exceeds 1000% by weight, the compound can hardly be formed into a film, and hence an ionic conductor layer having a uniform composition can hardly be obtained.

The ionic conductor layer of the present invention can contain a pigment for improving the display function (color contrast) and providing an aesthetic effect. Examples of the pigment include white pigments such as titanium dioxide ($TiO_2$), aluminum oxide ($Al_2O_3$), magnesium oxide (MgO), zirconium oxide ($ZrO_2$), yttrium oxide ($Y_2O_3$), tantalum pentoxide ($Ta_2O_5$), and silicon dioxide ($SiO_2$); and color pigments such as nickel titanium yellow, cadmium yellow, chromium yellow, cadmium red, molybdenum orange and red iron oxide. Among these pigments, it is preferred to use a white pigment in favor of the aesthetic effect. The content of the pigment with respect to the polymeric material preferably falls within the range of 5 to 50% and more preferably within the range of 10 to 30% of the weight of the polymeric material. When the content of the pigment is less than 5% by weight, the background color can be seen through the display electrode, thereby degrading the aesthetic effect. However, when the content of the pigment exceeds 50% by weight, the formation and ionic condictivity of the ionic conductor material are degraded.

The solid electrolyte containing the polymeric material can be formed on the EC layer 13 by the following process.

The polymeric material is mixed well with the inorganic ionic conductor material at the given mixing ratio. A pigment can also be added to the resultant mixture. If necessary, the mixture is diluted with a proper solvent so as to adjust the viscosity of the mixture. Alternatively, a polymer is diluted before hand for the purpose of the viscosity adjustment. The resultant mixture is applied by spin coating, dipping, roller coating, or spray coating to the EC layer 13. When the solvent is used, the coating is preferably heated at a temperature of 50° to 150° C. so as to evaporate the residual solvent in the film. The solvent for adjusting the viscosity includes nonaqueous solvent such as methyl ethyl ketone, methyl isobutyl ketone, toluene, xylene, cresol, ethyl cellosolve acetate, butyl cellosolve acetate, propylene carbonate, acetonitrile, dimethylacetoamide, N-methylpyrrolidone, dimethylformamide, and a mixture thereof. The degree of the dilution can be properly adjusted in accordance with the coating method adopted. The conditions for coating can be readily determined by a simple preliminary experiment.

2. Solid Electrolyte having Halogen Ionic Conductivity

Solid electrolytes of this type include: lead fluoride ($PbF_2$) or a solid solution of lead fluoride and potassium fluoride (KF); lead-tin fluoride ($PbSnF_4$), a solid solution [$(Pb_{1-x}Sn_xF_4)$ where x is 0.25 to 0.75] of lead fluoride and tin fluoride, or a material obtained by substituting part of lead and/or tin of these fluorides with potassium; a material including at least one material selected from the group consisting of rubidium-bismuth fluoride ($RbBiF_4$), potassium-bismuth fluoride ($KBiF_4$), a solid solution [$((PbF_2)_{1-x}(BiF_3)_x)$ wherein x is 0 to 0.5] of lead fluoride and bismuth fluoride, lead chloride ($PbCl_2$), tin chloride ($SnCl_2$), a solid solution $[((PbCl_2)_x(SnCl_2)_{1-x}]$ wherein x is 0.25 to 0.75] of lead chloride and tin chloride, lead bromide ($PbBr_2$), tin bromide ($SnBr_2$), a solid solution $[((PbBr_2)_x(SnBr_2)_{1-x}]$ wherein x is 0.25 to 0.75] of lead bromide and tin bromide, lanthanum fluoride ($LaF_3$), cerium fluoride ($CeF_3$), and lutetium fluoride ($LuF_3$); a complex of crown ether with lithium halogenide; and a $ZnF_4$-$BaF_2$-X type glass (wherein X is a glass of a mixture of at least one element selected from the group consisting of $ThF_4$, $LaF_3$, $NdF_3$ and $PrF_3$).

These materials is preferably formed into a film having a thickness of 200 Å to 1 μm preferably by vapor deposition or sputtering in order to decrease a resistance. However, when the film formed by such a method tends to decompose significantly or to change its composition ratio significantly, or to be degraded in its characteristics by any possible cause, an electrochromic layer can be formed by sintering or solidification on the plate-like solid electrolyte. Alternatively, a solid electrolyte powder having a particle diameter of 0.6 μm to 300 μm can be pressed on the electrochromic layer formed on the electrode.

In any one of the embodiments shown in FIGS. 1 and 2, the EC layer 13 can be formed such that the EC material is dispersed in a polymer and a resultant mixture is applied to the transparent electrode 12 or the solid ionic conductor layer 14. However, it is preferred that the EC layer 13 be directly formed by vapor deposition under a reduced pressure. The vapor deposition can be performed by using the apparatus schematically shown in FIG. 3. The apparatus has a vacuum tank 30. Vapor sources (EC materials) 33 supported by a proper support are disposed below a substrate 31 in the vacuum tank 30. A shutter 32 is disposed between the substrate 31 and the vapor sources 33. The vapor sources 33 are heated by heating power supplies 34. The vacuum tank 30 is kept at a predetermined vacuum pressure by a discharge system 35 including a pump P.

When the EC material is deposited on the substrate 31, the vacuum tank 30 is evacuated by the discharge system 35 and is kept at a vacuum pressure of $10^{-7}$ to $10^{-6}$ torr and preferably at a vacuum pressure of 1 to $5 \times 10^{-6}$ torr. Thereafter, the vapor sources 33 are heated by the power supplies 34 to a temperature falling within a range between about 300° C. and a temperature below the decomposition point of the EC material, and preferably within a range between 300° C. to 400° C. The EC materials 33 are evaporated and are deposited as a thin film on the substrate 31.

The thickness of the EC layer is not particularly limited. The thickness can be easily controlled in accordance with the deposition conditions (e.g., temperature, vaccum pressure, and time). The thickness of the EC layer generally falls within the range of 500 Å to 10 μm.

A deposited or sputtered film of $In_2O_3$, $SnO_3$ or Au can be used as the transparent electrode 12. A film of the same type may be used as the opposing electrode. However, the opposing electrode can comprise any other film. The substrate 31 preferably comprises a transparent insulator such as glass or polyester.

The EC display device of the present invention has good characteristics such as good response characteristics and good contrast and has a long service life with high stability and reliability.

The present invention will be described in detail by way of examples.

EXAMPLE 1

A transparent electrical conductor film of $In_2O_3$ was formed by sputtering on a glass plate, and the conductor film was patterned to allow desirable display. Tetrathiotetracene (general formula (I), wherein X=S) was deposited on the electrode by using a vacuum deposition apparatus at a temperature of 300° to 350° C. and at a pressure of $2.0 \times 10^{-6}$ torr for about 10 minutes, thereby forming an EC layer having a thickness of 5,000 Å. A glass plate having an identical transparent ionic conductor film was used as the opposing electrode. A spacer having an injection hole was adhered by an epoxy sealing agent between the two electrodes so as to form a cell. After the sealing agent was completely hardened, a 0.1M lithium perchlorate solution in propylene carbonate was filled in the space through the injection hole. The injection hole was sealed with a silicone rubber. The electrochromic display element thus prepared was connected to a DC power supply whose polarity could be reversed. A voltage of about 2.5 to 5 V was applied across the electrodes such that the display electrode was kept at a positive potential, and the color of the display electrode changed from green to reddish purple to reddish orange in accordance with the magnitude of the voltage. Even when application of the voltage was stopped, the display color was maintained. When a negative voltage was applied to the display electrode, the color of the display electrode returned to green.

EXAMPLES 2 TO 11

In the same manner as in Example 1, an $In_2O_3$ thin film was formed by sputtering on the glass plate and tetrathiotetracene was deposited by vacuum deposition on the electrode.

Meanwhile, 10 ionic conductor compositions shown in Table 1 were prepared. More specifically, polymeric materials were dissolved in proper solvents, and inorganic ionic conductor materials and pigments were added to the resultant mextures in proper amounts, respectively. The inorganic ionic conductor materials and the pigments were sufficiently dispersed by a ball mill and a triple roll mill.

The resultant mixtures were applied to the substrate having the deposited tetrathiotetracene film by dipping, or by spin, spray or roller coating. Subsequently, the substrates were placed on an iron plate heated to a temperature of 100° C. for about 30 minutes, so that the coatings were dried. As a result, uniform, thin ionic conductor films were obtained.

$In_2O_3$ was sputtered on the ionic conductor layers to form $In_2O_3$ films each having a thickness of 0.2 μm. Thus, opposing electrodes were obtained.

Epoxy resin was sealed in the gaps of the obtained substrates, thereby preparing 10 electrochromic display devices.

TABLE 1

|  | Polymer resin | Solvent | Inorganic ionic conductor | | Pigment | | Film coating conditions | |
|---|---|---|---|---|---|---|---|---|
|  |  |  | Type | Content** | Type | Content** | Method | Film thickness (μm) |
| Example 2 | polymethyl | methyl ethyl | $LiClO_4$ | 100 | $TiO_2$ | 20 | spinning | 2 |

TABLE 1-continued

| | Polymer resin | Solvent | Inorganic ionic conductor Type | Content** | Pigment Type | Content** | Film coating conditions Method | Film thickness (μm) |
|---|---|---|---|---|---|---|---|---|
| Example 3 | methacrylate polymethyl methacrylate | ketone methyl ethyl ketone | LiClO$_4$ | 300 | ZrO$_2$ | 30 | spinning | 1 |
| Example 4 | polymethyl methacrylate | methyl ethyl ketone | LiI | 50 | Y$_2$O$_3$ | 30 | spinning | 1 |
| Example 5 | methyl methacrylate-methacrylic acid copolymer | methyl ethyl ketone | LiOH | 80 | TiO$_2$ | 20 | roller | 3 |
| Example 6 | methyl methacrylate-methacrylic acid copolymer | methyl ethyl ketone | LiI | 40 | TiO$_2$ | 10 | roller | 2 |
| Example 7 | polystyrene | toluene | LiF | 100 | ZrO$_2$ | 10 | dipping | 1.2 |
| Example 8 | polystyrene | toluene | LiClO$_4$ | 200 | ZrO$_2$ | 20 | dipping | 1.5 |
| Example 9 | polystyrene | toluene | LiOH | 100 | Y$_2$O$_3$ | 15 | dipping | 1.5 |
| Example 10 | polyvinyl acetate | toluene | LiClO$_4$ | 300 | TiO$_2$ | 10 | spinning | 2 |
| Example 11 | polyvinyl acetate | toluene | LiF | 100 | TiO$_2$ | 10 | spinning | 4 |

**The content indicates the content (% by weight) with respect to the polymer resin.

A voltage of 2.5 to 5 V was applied to these electrochromic display devices such that their display electrodes were respectively kept at a positive potential. The color of each of the electrochromic display devices changed from green to reddish orange. When the display electrode of each of the electrochromic display devices was negatively biased, the color thereof immediately changed to green again.

EXAMPLE 12

A substrate was prepared by forming an In$_2$O$_3$—SnO$_2$ conductor film on a transparent glass plate. Tetrathiotetracene was deposited thereon at a pressure of $5 \times 10^{-6}$ torr for about 10 minutes, thereby obtaining a tetrathiotetracene film having a thickness of about 5,000 Å. In this case, PbSnF$_4$ to be deposited was obtained by melting and solidifying PbF$_2$ and SnF$_2$ in a platinum melting pot in an inert atmosphere. A tungsten wire was used as the heating wire at the time of deposition. PbSnF$_4$ was placed in an alumina pot and the tungsten heater was coated with alumina cement, thereby preventing reaction between PbSnF$_4$ and tungsten. Gold was then deposited on the PbSnF$_4$ film to prepare an electrode. When a voltage was applied across the In$_2$O$_3$—SnO$_2$ film and the gold electrode such that the In$_2$O$_3$—SnO$_2$ film was held at a positive potential, the color of the tetrathiotetracene film changed from green to yellowish red. When a negative voltage was applied to the display electrode, the color thereof returned to green. This color change could be repeatedly performed.

EXAMPLE 13

PbSnF$_4$ prepared in the same manner as in Example 12 was pulverized by an alumina ball mill to obtain a powder having a particle size of 1.5 μm. The powder was sintered by a hot press in a nitrogen atmosphere at a pressure of 1 t/cm$^3$ and at a temperature of 400° C. to prepare a polycrystalline plate having a thickness of 0.4 mm. Gold was then deposited on one major surface of the polycrystalline plate, and tetrathiotetracene was deposited on the other major surface to a thickness of 1,000 Å. A sintered body obtained by adding 1% of stannic oxide to indium oxide was sputtered on the tetrathiotetracene to a thickness of about 800 Å. The sputtered film and the deposited gold were used as the electrodes. When a voltage of about 2 V was applied to these electrodes, electrochromic characteristics could be observed.

What is claimed is:
1. An electrochromic display device comprising:
   a transparent first electrode;
   a second electrode opposing said first electrode which is spaced apart therefrom;
   an electrochromic layer in a space formed between said first and second electrodes so as to be in contact with said first electrode, said electrochromic layer comprising an electrochromic material selected from the group consisting of a naphthalene derivative given by formula:

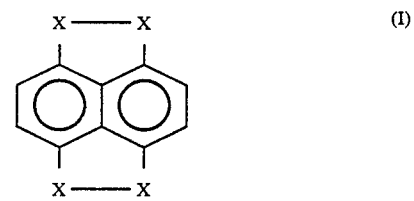

(I)

where X is sulfur, selenium or tellurium; a tetracene derivative given by formula:

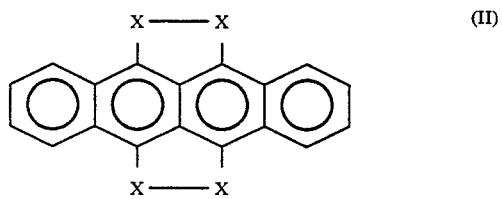

(II)

where X has the same meaning as above; and
   an ionic conductor layer formed in said space so as to be in contact with said electrochromic layer.
2. A device according to claim 1, wherein said electrochromic layer is formed by vacuum deposition.
3. A device according to claim 1, wherein said ionic conductor layer comprises a liquid ionic conductor material.

4. A device according to claim 3, wherein the liquid ionic conductor material comprises an aqueous solution of an inorganic electrolyte.

5. A device according to claim 4, wherein the inorganic electrolyte comprises a material selected from the group consisting of a halogenide, a perchlorate and a nitrate.

6. A device according to claim 3, wherein the liquid ionic conductor material comprises a solution of an inorganic electrolyte in an organic solvent.

7. A device according to claim 6, wherein the electrolyte comprises a material selected from the group consisting of a halogenide, a perchlorate and a nitrate.

8. A device according to claim 7, wherein the organic solvent comprises a material selected from the group consisting of acetonitrile, dimethylformamide, dimethylacetoamide, propylene carbonate, methanol, ethanol, methylene chloride, acetone, pyridine and ethylene diamine.

9. A device according to claim 1, wherein said ionic conductor layer comprises a solid ionic conductor material.

10. A device according to claim 9, wherein the solid ionic conductor material comprises a polymeric material and an inorganic solid electrolyte, wherein the ionic conductor material has a range of 0.01 to 1,000% of the weight of the polymeric material.

11. A device according to claim 10, wherein the polymeric material comprises a material selected from the group consisting of polymethylmethacrylate, a methacrylate-methacrylic acid copolymer, polystyrene, and polyvinyl acetate.

12. A device according to claim 11, wherein the inorganic solid electrolyte comprises a material selected from the group consisting of lithium perchlorate, lithium iodide, lithium fluoride, and lithium hydroxide.

13. A device according to claim 10, wherein the solid ionic conductor material contains a pigment.

14. A device according to claim 13, wherein the pigment comprises a white pigment.

15. A device according to claim 9, wherein the solid ionic conductor material has halogen ionic conductivity.

16. A device according to claim 15, wherein the solid ionic conductor material having halogen ionic conductivity comprises lead fluoride ($PbF_2$) or a solid solution of lead fluoride and potassium fluoride (KF); lead-tin fluoride ($PbSnF_4$), a solid solution [($Pb_{1-x}Sn_xF_4$) wherein x is 0.25 to 0.75] of lead fluoride and tin fluoride, or a material obtained by substituting part of lead and tin of the lead and tin fluorides with potassium; and a material including at least one material selected from the group consisting of rubidium-bismuth fluoride ($RbBiF_4$), potassium-bismuth fluoride ($KBiF_4$), a solid solution [$((PbF_2)_{1-x}(BiF_3)_x)$ wherein x is 0 to 0.5] of lead fluoride and bismuth fluoride, lead chloride ($PbCl_2$), tin chloride ($SnCl_2$), a solid solution [$((PbCl_2)_x(SnCl_2)_{1-x})$ where x is 0.25 to 0.75] of lead chloride and tin chloride, lead bromide ($PbBr_2$), tin bromide ($SnBr_2$), a solid solution [$((PbBr_2)_x(SnBr_2)_{1-x}$ wherein x is 0.25 to 0.75] of lead bromide and tin bromide, lanthanum fluoride ($LaF_3$), cerium fluoride ($CeF_3$), lutetium fluoride ($LuF_3$); or a mixture thereof.

17. A device according to claim 15, wherein the solid ionic conductor material having halogen ionic conductivity comprises a complex of crown ether and lithium halogenide.

18. A device according to claim 15, wherein the solid ionic conductor material having halogen ionic conductivity comprises a $ZnF_4$—$BaF_2$—X type glass (wherein X is a glass of a mixture of at least one element selected from the group consisting of $ThF_4$, $LaF_3$, $NdF_3$ and $PrF_3$).

19. A device according to claim 1, wherein the electrochromic material comprises the naphthalene derivative.

20. A device according to claim 1, wherein the electrochromic material comprises the tetracene derivative.

21. A device according to claim 20, wherein the electrochromic material comprises tetrathiotetracene.

* * * * *